(12) United States Patent
Bailie (10) Patent No.: US 11,845,402 B2
(45) Date of Patent: Dec. 19, 2023

(54) RETRACTABLE STEP FOR VEHICLE WHEEL WELL

(71) Applicant: William Bailie, White Rock (CA)

(72) Inventor: William Bailie, White Rock (CA)

(*) Notice: Subject to any disclaimer, the term of this patent is extended or adjusted under 35 U.S.C. 154(b) by 41 days.

(21) Appl. No.: 17/425,927

(22) PCT Filed: Jan. 24, 2020

(86) PCT No.: PCT/CA2020/050092
§ 371 (c)(1),
(2) Date: Jul. 26, 2021

(87) PCT Pub. No.: WO2020/150839
PCT Pub. Date: Jul. 30, 2020

(65) Prior Publication Data
US 2022/0134956 A1 May 5, 2022

Related U.S. Application Data

(60) Provisional application No. 62/796,523, filed on Jan. 24, 2019.

(51) Int. Cl.
*B60R 3/02* (2006.01)
(52) U.S. Cl.
CPC ..................................... *B60R 3/02* (2013.01)
(58) Field of Classification Search
CPC ....................................................... B60R 3/02
See application file for complete search history.

(56) References Cited

U.S. PATENT DOCUMENTS

| | | |
|---|---|---|
| 5,538,265 A | 7/1996 | Chen et al. |
| 6,082,752 A * | 7/2000 | Sumrall ................... B60R 3/02 182/150 |
| 7,703,784 B2 | 4/2010 | Plavetich |
| 9,120,426 B1 * | 9/2015 | Huebner ................... B60R 3/02 |
| 9,586,527 B1 * | 3/2017 | Salter ..................... B60Q 1/2661 |
| 2010/0301580 A1 * | 12/2010 | Stahl ......................... B60R 3/00 280/166 |
| 2015/0224935 A1 * | 8/2015 | Huebner ................... B60R 3/02 280/166 |

FOREIGN PATENT DOCUMENTS

WO 0047448 8/2000

OTHER PUBLICATIONS

ISR & Written Opinion dated Apr. 16, 2020 for PCT/CA2020/050092, 8 pages.

* cited by examiner

*Primary Examiner* — Bryan A Evans
(74) *Attorney, Agent, or Firm* — Richard D. Okimaw (57) ABSTRACT

A retractable step for a vehicle comprises an arcuate member extending between first and second ends and a pair of pivots secured to the vehicle proximate to or within a wheel well of the vehicle so as to pivotally support the arcuate member proximate to each of the first and second ends of the arcuate member between a raised position surrounding or within the wheel well and a lowered position extending substantially horizontally from the vehicle proximate to the wheel well wherein the arcuate member provides or supports a step for a user.

18 Claims, 11 Drawing Sheets

RETRACTABLE STEP FOR VEHICLE WHEEL WELL

BACKGROUND OF THE INVENTION

1. Field of Invention

The present invention relates generally to vehicles in general and in particular to a method and apparatus for providing a retractable step from a vehicle wheel well.

2. Description of Related Art

Pick-up trucks, sport utility vehicles (SUVs) and vans are popular vehicles of choice for many people. In particular, the market share of trucks and SUVs has been increasing in recent years. In the case of pick-up trucks, the provision of the bed has been found to be useful for carrying a wide variety of objects. It has commonly been difficult, however for some people to access the contents of the bed due to the height of the pick-up truck relative to such users. As pick-up trucks have been developed, the height of the bed has tended to increase further increasing this difficulty. Similarly, in the case of SUVs and vans, users may frequently need to access objects located on the roof of the vehicle which may be difficult It has been attempted to provide steps around the bed to aid users in accessing the bed of the truck. In particular, stepside pick-ups have been utilized in the past wherein a step is incorporated into the outside of the box. Disadvantageously, however, such designs reduce the size of the box and therefore the overall cargo carrying capacity of the truck.

Other attempts have been made to provide steps incorporated into the rear bumper or tailgate of the truck. Disadvantageously, such steps are commonly located at the rear of the vehicle and do not assist in reaching items near the front of the box.

SUMMARY OF THE INVENTION

According to a first embodiment of the present invention there is disclosed a retractable step for a vehicle comprising an arcuate member extending between first and second ends and a pair of pivots secured to the vehicle proximate to or within a wheel well of the vehicle so as to pivotally support the arcuate member proximate to each of the first and second ends of the arcuate member between a raised position surrounding or within the wheel well and a lowered position extending substantially horizontally from the vehicle proximate to the wheel well.

The raised position may be contained within the wheel well. The arcuate member may be at least partially flexible. The arcuate member may be at least partially rigid.

The pivots may include a biased member adapted to selectably prevent rotation of the arcuate member at at least one position. The arcuate member may include a wedge portion adapted to bias the biased member out of engagement with a base portion so as to permit rotation of the biased member and the arcuate member. The biased member may include pins adapted to engage a base portion of the pivots at the raised position. The biased member may include pins adapted to engage a base portion of the pivots at the lowered position.

The retractable step may further include a top step hingedly connected to the arcuate member. The vehicle may include a support adapted to prevent rotation of the arcuate member past horizontal when moving from the raised position to the lowered position. The support may extend from the vehicle to engage with the first and second ends of the arcuate member. The support may extend from the vehicle. The top step may include a pin adapted to engage a shelf support. The retractable step may further includes a bottom step hingedly connected to the top step. The retractable step may further includes a fixed step fixedly connected to the arcuate member. The fixed step may further includes a hinged step hingedly connected thereto.

According to a further embodiment of the present invention there is disclosed an apparatus comprising a vehicle having a body with at least one wheel well and at least one retractable step as setout herein.

According to a first embodiment of the present invention there is disclosed a method for providing access to a vehicle comprising securing a pair of pivots to the vehicle on opposite sides of a wheel well of the vehicle, supporting an arcuate member by the pair of pivots at a raised position surrounding or within the wheel well and translating the arcuate member in a downward direction wherein by the downward translation disengages the arcuate member from retaining means so as to thereafter permit rotation of the arcuate member to a horizontal orientation extending from the vehicle proximate to the wheel well. The method may further comprise engaging first and second ends of the arcuate member on a support adapted to selectably prevent rotation of the arcuate member lower than horizontal.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
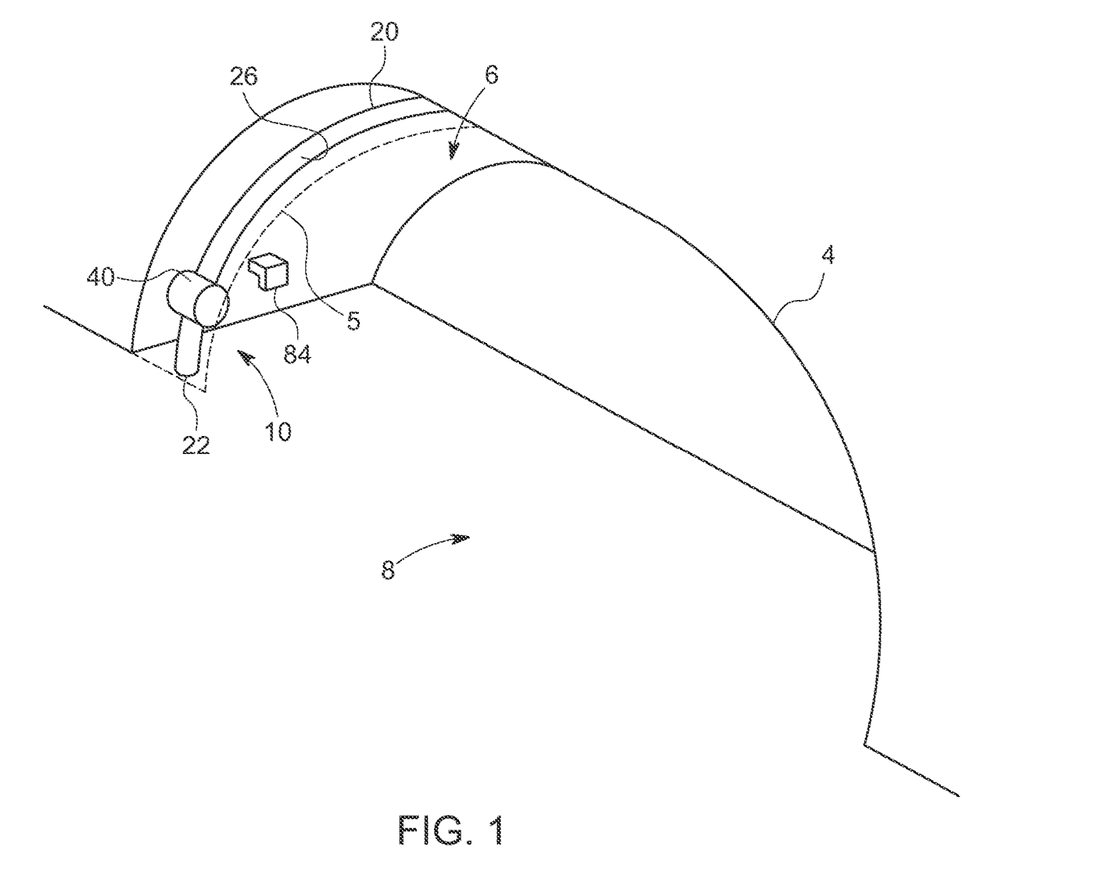
FIG. 1 is a perspective view of a wheel well of a truck with a retractable step therein at a raised position.

Referring to FIG. 1, an apparatus for providing access to a vehicle according to a first embodiment of the invention is shown generally at 10. It will be appreciated that the apparatus disclosed herein may be utilized in a pick-up truck, an SUV, a van or any other vehicle. The apparatus comprises an arcuate member 20 located within the wheel well 8 of a pick-up truck as are commonly known. As will be more fully set out below, the arcuate member 20 is adapted to be rotatable from a vertical stored orientation within the wheel well to a horizontal orientation so as to support a top step 70 thereon. As is commonly known, a vehicle wheel well 8 may include an opening formed in the side of a vehicle by an arcuate surface 6 extending to a rear surface 4.

Figure 3:
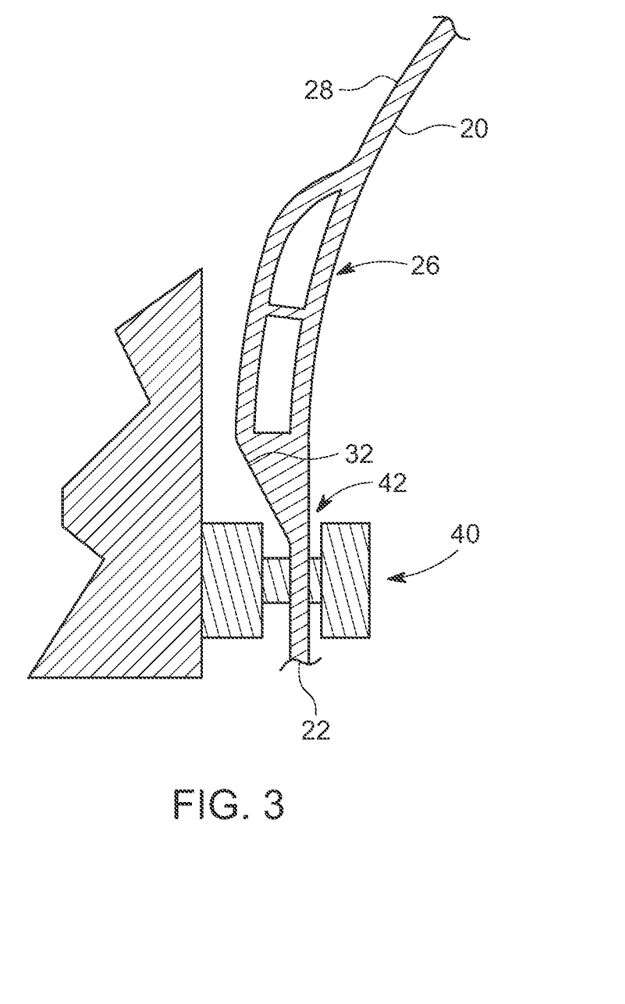
FIG. 3 is a detailed side view of one side of the retractable step of FIG. 1.
Figure 4:
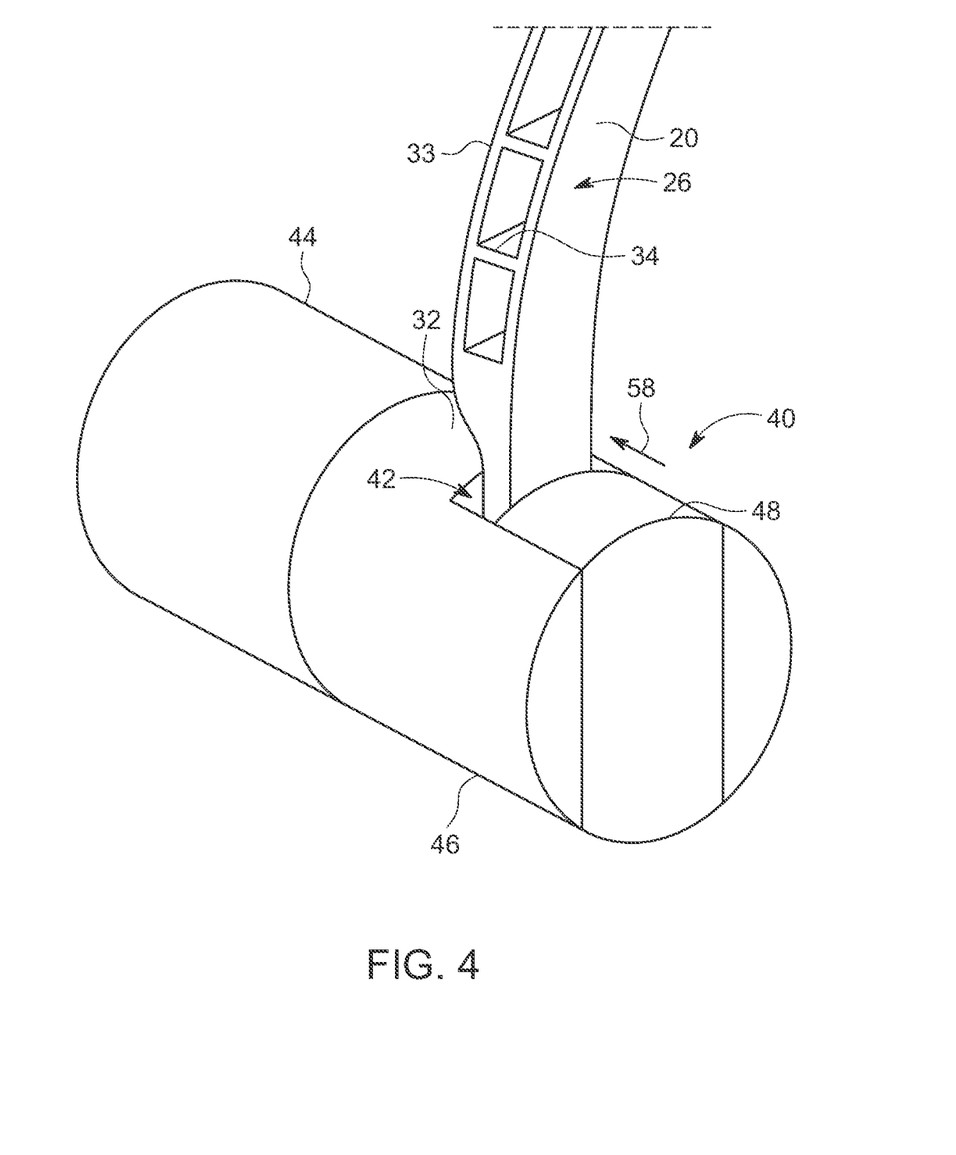
FIG. 4 is a detailed view of the pivot of one side the retractable step of FIG. 1.
Figure 5:
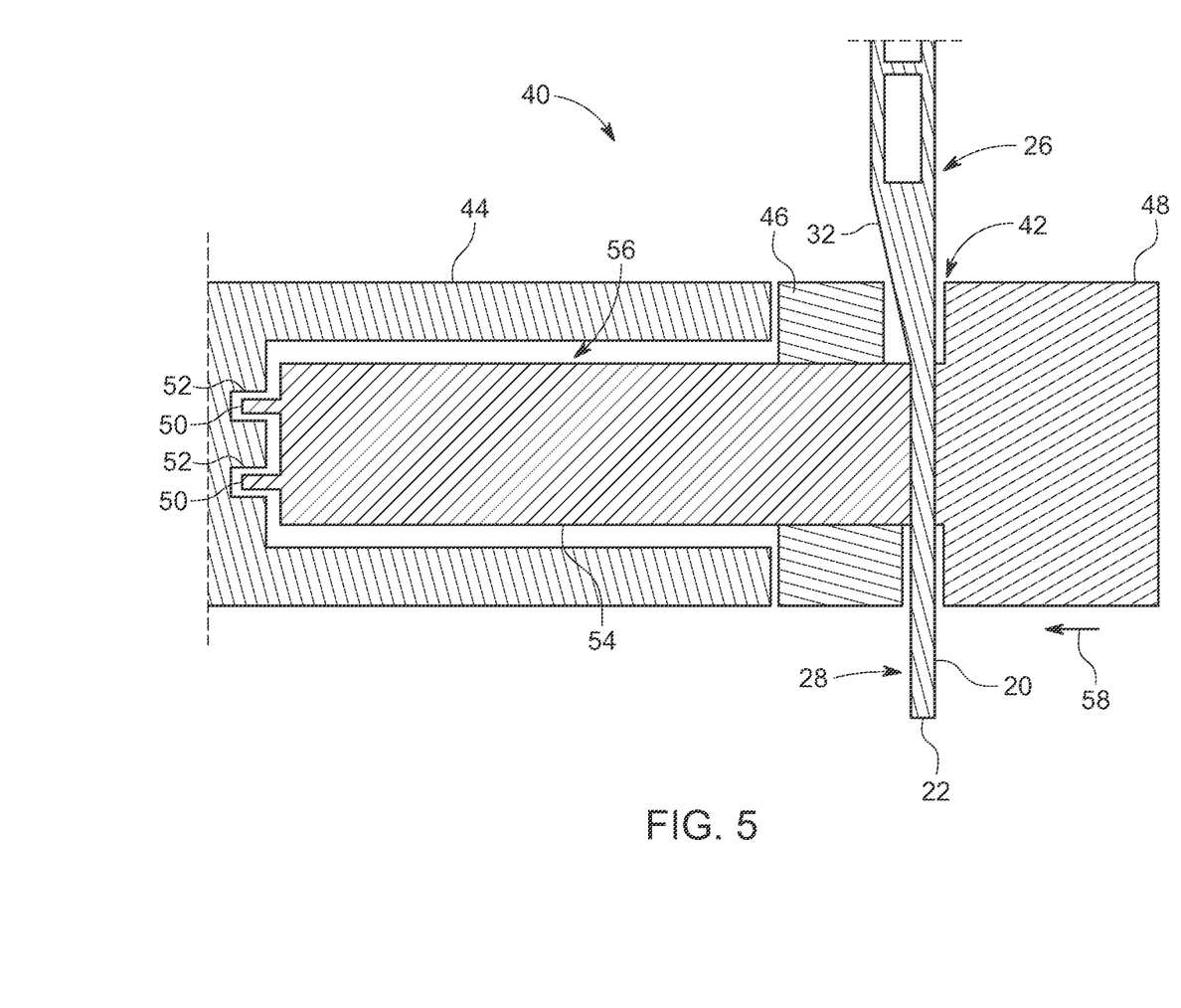
FIG. 5 is a cross sectional view of the pivot assembly of the retractable step of FIG. 1.

The arcuate member 20 comprises an elongate flexible member extending between ends 22, along an arcuate path. As illustrated, the arcuate member 20 is has a length and shape selected to correspond to the arcuate surface 6 of the wheel well in which it is intended to be installed. The arcuate member 20 may be formed of a strip of metal by way of non-limiting example having inner and outer surfaces 26 and 28, respectively. The arcuate member is pivotally and slidably supported proximate to each of the ends 22 by a pivot assembly 40 as will be more fully described below. As illustrated in FIGS. 3-5, each of the ends 22 of the arcuate member includes a wedge 32 located on the outer surface 28 thereof, the purpose of which will be more fully described below.

Turning now to FIGS. 3 through 5, each pivot 40 supports the arcuate member 20 through a slot 42 therein which is illustrated in partial cross section in FIG. 3. It will be appreciated that the fender edge 5 is not shown in FIG. 3 for clarity purposes. As illustrated in FIG. 4, each pivot 40 comprises a stationary base member 44, pivotally supporting a rotatable member 46. The rotatable member includes a biased body 48 therein which is biased towards the base member 44 wherein the slot 42 is formed between the biased body 48 and the rotatable member 46.

Figure 2:
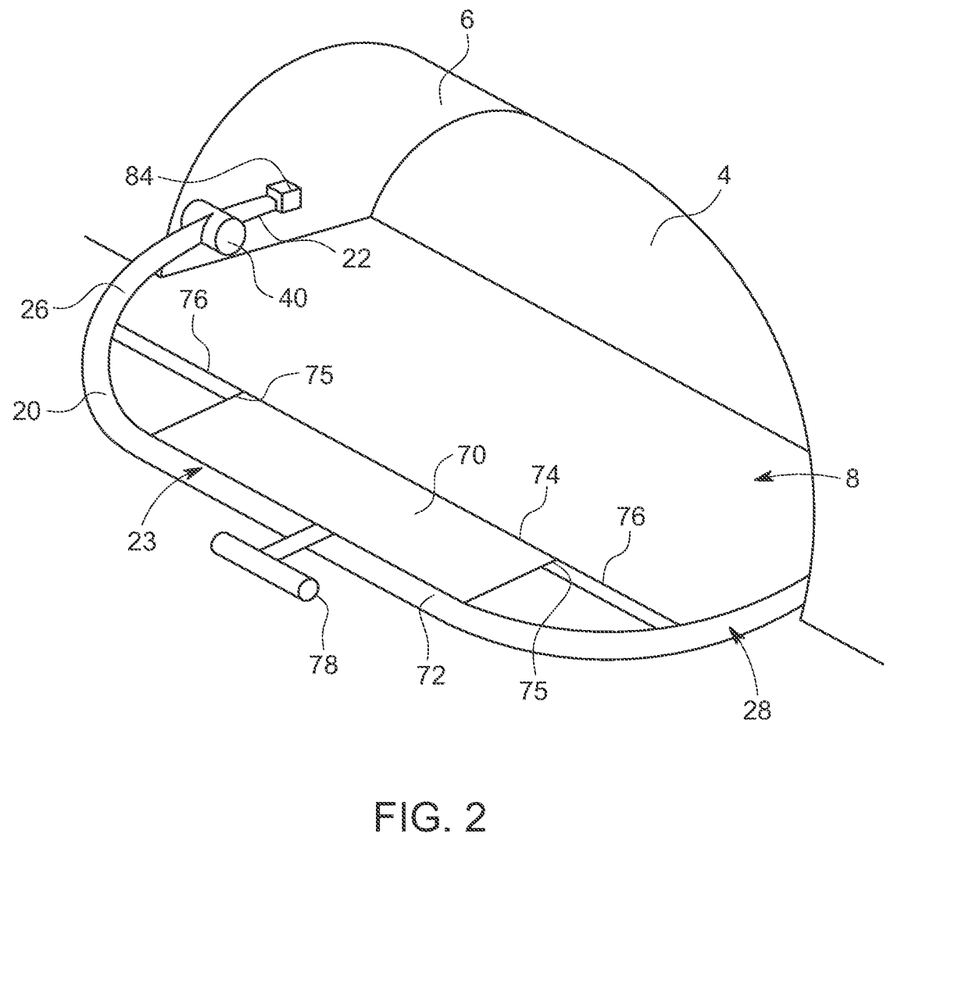
FIG. 2 is a perspective view of a wheel well of a truck with a retractable step of FIG. 1 therein at a lowered position.
Figure 14:
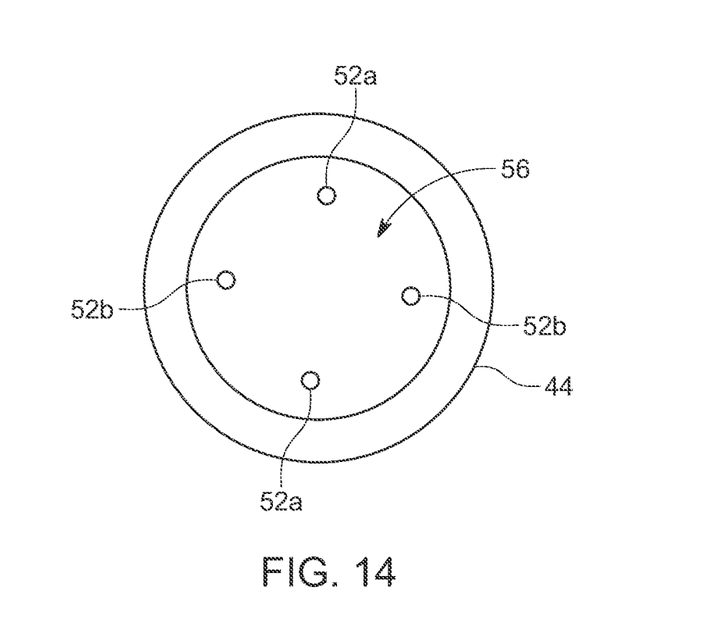
FIG. 14 is a plan view of the pin bores within bore of the pivot.

As illustrated in FIG. 5, the biased body 48 includes an extension 54 adapted to be received with in a bore 56 in the base member 44 so as to permit relative rotation therein. It will be appreciated that such rotation may be assisted by bearings, bushings or the like. As set out above, the biased body 48 is biased in a direction generally indicated at 58 so as to maintain the slot 42 as small as possible. Such a biasing force may be provided by any known biasing apparatus, such as, by way of non-limiting example, springs or the like. The biased body 48 includes a plurality of pins 50 extending parallel to a longitudinal length thereof. As illustrated in FIGS. 4 and 5, the pins 50 are operable to be received within pin bores 52 located in a blind end of the bore 56. The pins prevent relative rotation of the rotatable member 46 and the biased member until the slot 42 is widened by a sufficient distance so as to disengage the pins 50 from the pin bores 52. It will also be appreciated that more than one set of pin bores may be provided to permit the arcuate member 20 to be locked at different orientations such as, by way of non-limiting example, at horizontal 52a to support the arcuate member at a vertical orientation and vertical 52b to support the arcuate member at a horizontal orientation as illustrated in FIG. 14. It will also be appreciated that other selectable engagement means may be utilized to permit selective rotation of the biased body 48 such as, by way of non-limiting example, slots, splines or indexed faces as are commonly known. The rotatable member 46 may also optionally include a damper or spring (not shown) adapted to be compressed as the arcuate member 20 rotates from the raised to the lowered position as shown in FIG. 2 so as to prevent impacts and optionally assist with raising the arcuate member 20.

Figure 15:
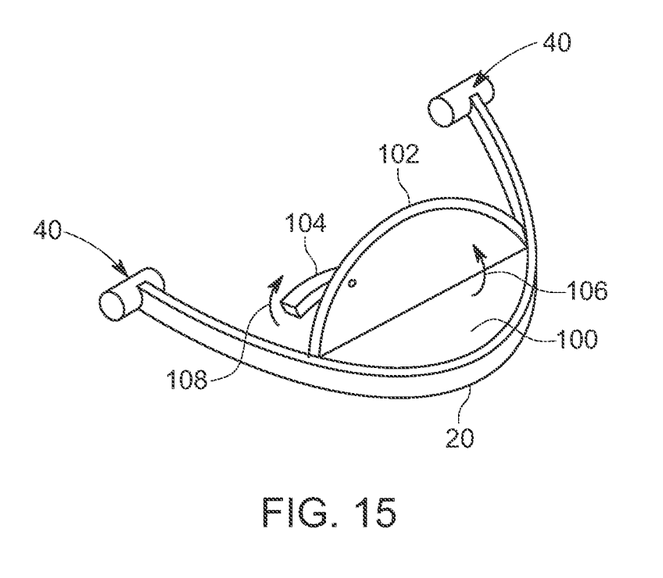
FIG. 15 is a perspective view of a retractable step for use in the wheel well of a truck according to a further embodiment of the present invention at an intermediate positon.

Turning now to FIGS. 6 through 9, the top step 70 comprises a planar member extending between front and rear edges 72 and 74, respectively. The front edge 72 is rotatably connected to a top portion 23 of the arcuate member 20 in any known means, such as, by way of non-limiting example, hinges, pivots or the like. The rear edge 74 of the top step includes at least one extension 76 extending substantially parallel to the rear edge 74 and having a length sufficient to engage upon and support the rear edge 74 on the arcuate member as shown in FIG. 2. The extensions 76 may be optionally hingedly connected to the top step 70 at a hinge line 75 such that they are permitted to rotate down but not above parallel to the top step 70 so as to facilitate locating within the wheel well. The top step 70 may also be profiled, such as, by way of non-limiting example, curved to match the shape of such wheel well. Optionally, a handle 78 may extend from the front edge 72 of the top step. Optionally, as illustrated in FIG. 15, a fixed step 100 may be fixed across the arcuate member 20 at a position so as to not interfere with the operation of the tire depending on space availability in some vehicles. The fixed step 100 may further include a flip up step 102 hingedly connected thereto with one or more support braces 104 extendable from the flip up step 102 to support it on the arcuate member 20. In operation, the flip up step may be parallel to the fixed step in the raised position of the arcuate member and rotated upwardly therefrom in a direction generally indicated at 106. The support braces 104 may also be rotated from a stored positon under the flip up step 102 to an extended position to engage on the arcuate member to support the flip up step parallel to the fixed step.

Figure 6:
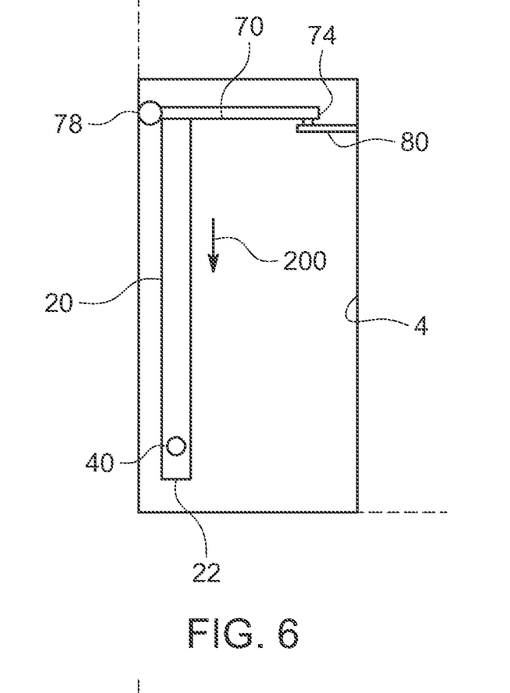
FIG. 6 is a cross sectional view of the retractable step of FIG. 1 at the raised position.
Figure 7:
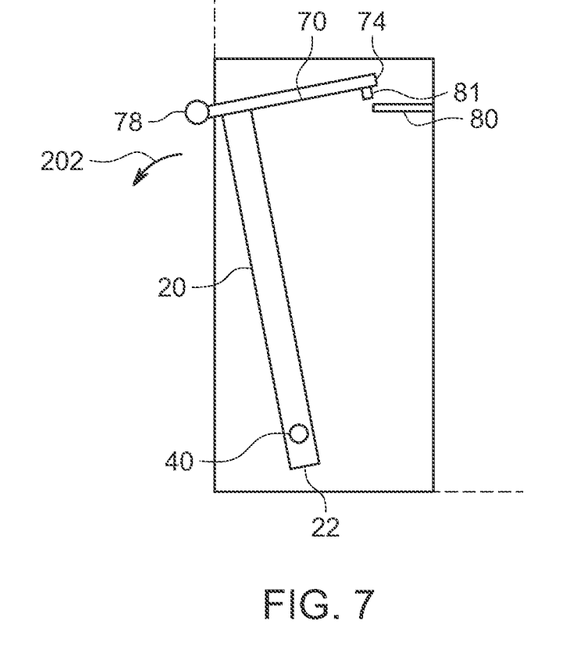
FIG. 7 is a cross sectional view of the retractable step of FIG. 1 at an intermediate position.

In operation, the arcuate member 20 is stored in the raised vertical configuration within the wheel well 8 as illustrated in FIG. 6. As illustrated in FIG. 1, the arcuate member 20 may be located inside the wheel well 8 when stored such that the edge of the fender 5 hides or obstructs the arcuate member 20 from view in such stored position. In such stored orientation, the top step 70 is extended perpendicular to the arcuate member. The rear edge 74 is adapted to overlie and be supported on a shelf member 80 extending from the rear surface 4 of the wheel well 8. Optionally, as illustrated in FIG. 7, the shelf member 80 may include a protrusion adapted to engage upon and selectably retain the top step 70 thereon. When desired for use, a user pulls the arcuate member 20 in a vertically downward direction 200. It will be appreciated that some rotation or flexing of the top step 70 may be required for such movement. Such movement will slidably move the wedges 32 into the slots 42 so as to move the biased body 48 away from the base members 44 in the pivots 40. As set out above, when such movement of the biased body 48 is sufficient to disengage the pins 50 from the pin bores 52, as well as to bias the arcuate member 20 inward to a position sufficient to clear the fender edge 5. The rotatable member 46 will thereafter be permitted to rotate relative to the base member 44 thereby permitting the arcuate member 20 to rotate in a downward direction 202 as illustrated in FIG. 7. It will be appreciated that the wedges 32 will also assist in biasing the sides of the arcuate member 20 inward which may ensure that the arcuate member thereafter is able to rotate past any fenders or lips thereon.

Figure 8:
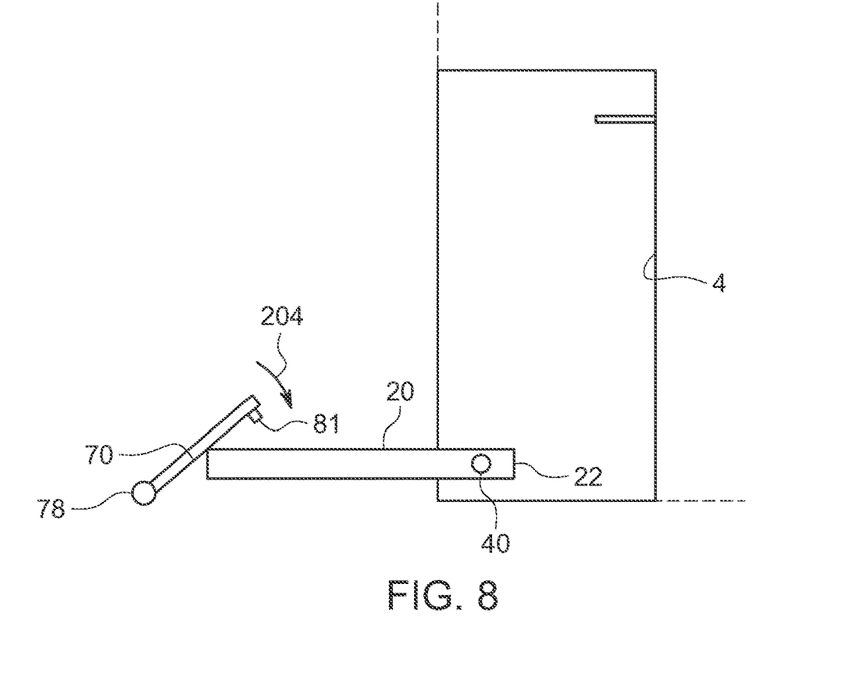
FIG. 8 is a cross sectional view of the retractable step of FIG. 1 at a further intermediate position.
Figure 9:
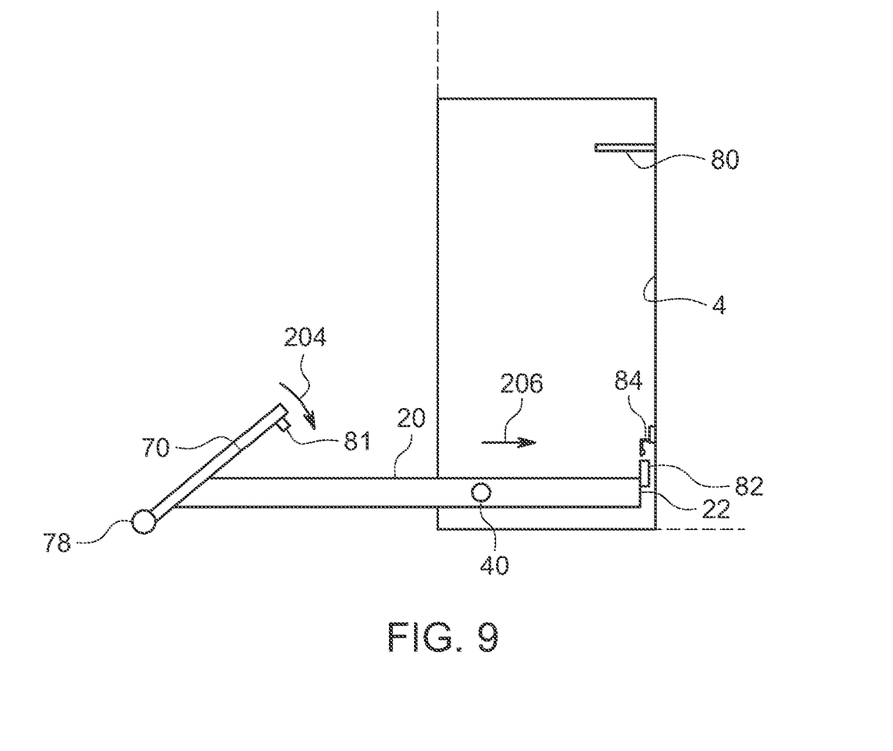
FIG. 9 is a cross sectional view of the retractable step of FIG. 1 at the lowered position according to a further embodiment of the present invention.

The rotation of the arcuate member 20 may be stopped at a horizontal orientation as illustrated in FIG. 8 by an internal end limit within the pivot 40 as is commonly known. Optionally, as illustrated in FIG. 9, the ends 22 of the arcuate member 20 may be moved inward in a direction indicated at 206 into engagement with the a support on the vehicle or wheel well surface. In particular, as illustrated in FIG. 9, the support may be located on rear surface 4 of the wheel well such that a portion or a lip 82 thereof engages under a corresponding catch 84 extending from the rear surface 4 to retain the arcuate member in the position illustrated and prevent outward or further downward rotational movement of the arcuate member 20. The catch 84 may include a latch, friction or other means for retaining the lip 82 therein so as to prevent accidental dislodgement therefrom. Optionally, the ends 22 may bear against one or more existing portions of the vehicle, including, by way of non-limiting example, the frame, body panels, suspension members or box members. Optionally, the wheel well may include one or more catches 84 on a side thereof adapted to engage the ends 22 of the arcuate member 20 as illustrated in FIGS. 1 and 2. The arcuate member may be supported at the horizontal orientation by pins 50 a support 84 or both depending on the configuration of the vehicle and the size of the loads required to be supported. As illustrated in FIGS. 3 and 4, the wedge 32 may include extended portions 33 parallel to the arcuate member 20 so as to maintain the slot 42 width while the arcuate member is slid inwardly to the vehicle to engage thereupon as illustrated in FIG. 9. The extended portion 33 may be maintained spaced apart from the arcuate member 20 by one or more spacers 34. Optionally, the extended portion 33 may include a wedge 32 on each side thereof as illustrated in FIGS. 3 and 4 so as to permit the biased body to be retracted after the arcuate member 20 is moved a sufficient distance down or into the wheel well thereby re-locking the rotatable member 46.

Once the arcuate member 20 is horizontal, the top step 70 is rotated downward in a direction indicated at 204 so as to rest the extensions 76 on the arcuate member thereby forming a step for access to the vehicle.

Figure 10:
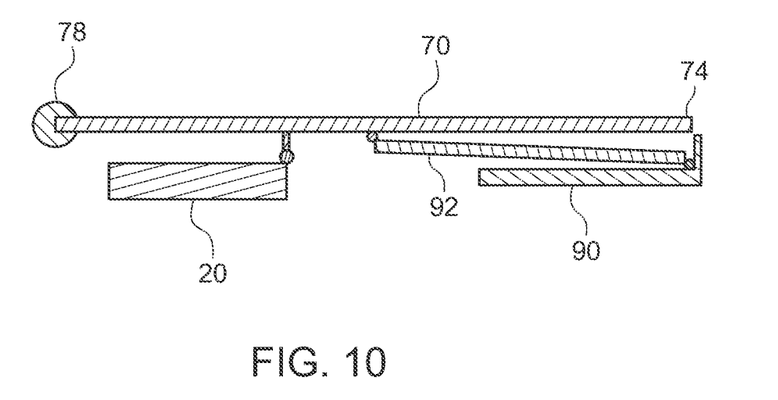
FIG. 10 is a cross sectional view of the retractable step of FIG. 1 with an optional drop down step at a retracted position.
Figure 11:
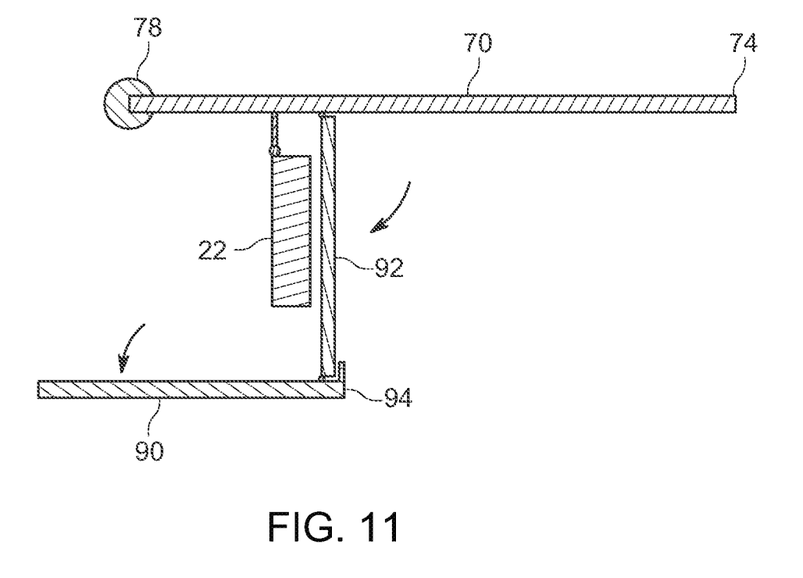
FIG. 11 is a cross sectional view of the retractable step of FIG. 1 with an optional drop down step at an extended position.
Figure 12:
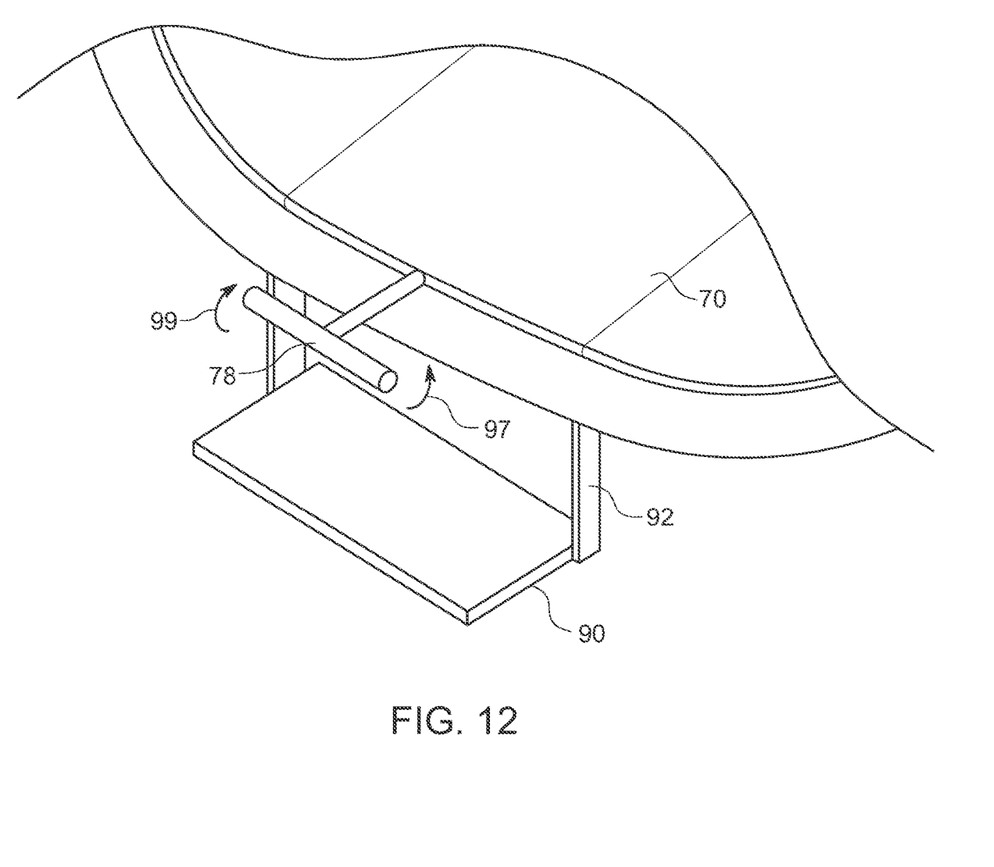
FIG. 12 is a perspective view of the retractable step of FIG. 1 at the optional drop down step at an extended position.

Turning now to FIGS. 10-12, the apparatus 10 may optionally include a bottom step 90. The bottom step may comprise a planar member supported by one or more link members 92. The link members 92 are pivotally connected to the top step 70 and may pivotally support the bottom step 90 therebelow or therebetween by any commonly known means such as, by way of non-limiting example, hinges or pin connections. As illustrated in FIG. 10, the bottom step 90 and link members 92 may be folded to remain substantially parallel to the top step 70 in the stored position as illustrated in FIG. 6. Once the arcuate member 20 and top step are moved to the extended position as illustrated in FIG. 8, the link members 92 may be permitted to rotate downward such that the bottom step 90 is supported parallel to and below the top step 70 so as to form two steps for a user. As illustrated in FIG. 11, the bottom step may include a rear lip 94 at a rear edge thereof adapted to engage upon the link members 92 so as to limit rotation to a horizontal or above orientation. It will also be appreciated that the one or more of the link members 92, bottom step and/or rear lip may include a means for preventing the link members 92 from moving rearward under load upon the bottom step 90, such as, by way of non-limiting example, slots, pin locks or the like. Optionally strings chains or the like may also be used to support the bottom step 90 at a horizontal orientation. As illustrated, the link members 92 may be pivotally connected to the top step 70 at a position such that they bear against the inside surface of the arcuate member 20 at the extended position to limit further rotation outward. Rotation locks, pins or other rotation fixing means may also be utilized to fix the rotation of the link members 92 or bottom step at one or both orientation. Optionally, the top step 70 may include one or more handles 78 thereon to aid deployment and retraction. As illustrated in FIG. 12, the handle 78 may optionally be rotatable such that rotation in a first direction 97 is operable to release a catch, such as, by way of non-limiting example, a spring loaded pin 81 in top step 70 to permit movement 202 by disengaging from the shelf 80. Optionally, the top step 70 may be retained in an upright orientation when stored by a pin extending from or into the arcuate member 20 or any other selectable rotation lock as are commonly known. Rotation in a second direction 99 may also optionally release a catch, such as, by way of non-limiting example, a spring loaded pin in one or more of the link members 92 and/or bottom step 90 to permit the bottom step 90 to be moved into the extended position illustrated in FIG. 11.

Figure 13A:
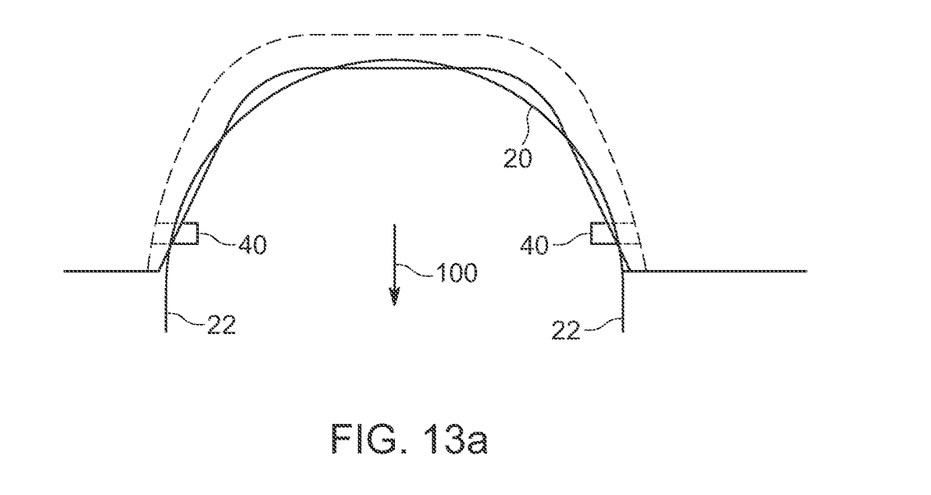
FIG. 13a is a side view of a retractable step for use in the wheel well of a truck according to a further embodiment of the present invention at a raised positon.
Figure 13B:
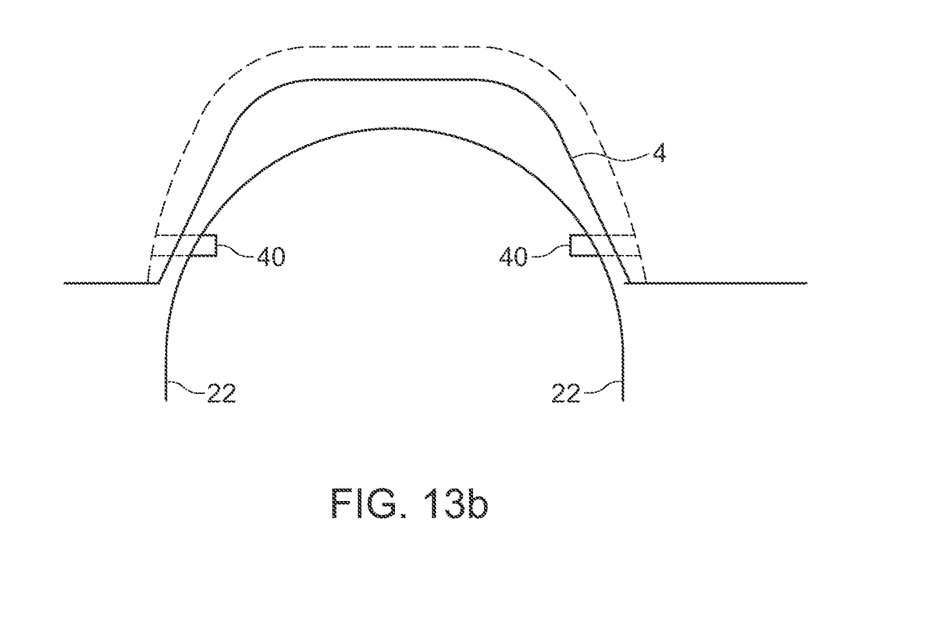
FIG. 13b is a side view of a retractable step for use in the wheel well of a truck according to a further embodiment of the present invention at an intermediate positon.

Turning now to FIGS. 13a and 13b, according to a further embodiment, the arcuate member 20 may be substantially rigid so as to resist bending. In such embodiments, the downward translation of the arcuate member within the rotatable member 46 will cause a narrower portion of the arcuate member 20 to moved between the rotatable member 46 and the biased body 48 so as to move the biased bodies 48 towards each other thereby disengaging the pins 50 from the pin bores as set out above. At such position as illustrated in FIG. 13b, the widest portions of the arcuate member 20 being the distal ends 22 will be below the wheel well 8 of the vehicle or moved into a wider portion of the wheel well and furthermore, the remaining portion of the arcuate member 20 will be narrow enough to permit rotation of the arcuate member outwardly therefrom as set out above. Furthermore, although the present apparatus is described and shown as being secured within a wheel well, it will also be appreciated that the arcuate member 20 and pivot assembly 40 may be secured to the body of the vehicle so as to surround the wheel well on an outside of the body thereof or built into the lip of the fender or wheel well. In such configurations, the arcuate member may be located proximate to the outside of the body of the vehicle in the stored or upright position. Such arcuate member may form part of or be incorporated into a fairing or fender extension as are commonly known.

While specific embodiments of the invention have been described and illustrated, such embodiments should be considered illustrative of the invention only and not as limiting the invention as construed in accordance with the accompanying claims.

What is claimed is:

1. A retractable step for a vehicle having a void set within the exterior body of the vehicle so as to define a wheel well, the retractable step comprising:
   an arcuate member extending between first and second ends sized and shaped to be contained within the wheel well of the vehicle; and
   a pair of pivots secured to the vehicle within a wheel well of the vehicle so as to pivotally support said arcuate member proximate to each of said first and second ends of said arcuate member between a raised position contained within said wheel well and a lowered position extending substantially horizontally from the vehicle proximate to said wheel well.

2. The retractable step of claim 1 wherein said raised position is contained within said wheel well.

3. The retractable step of claim 1 wherein said arcuate member is at least partially flexible.

4. The retractable step of claim 1 wherein said arcuate member is at least partially rigid.

5. The retractable step of claim 1 wherein said pivots include a biased member adapted to selectably prevent rotation of said arcuate member at at least one position.

6. The retractable step of claim 5 wherein said arcuate member includes a wedge portion adapted to bias said biased member out of engagement with a base portion so as to permit rotation of said biased member and said arcuate member.

7. The retractable step of claim 6 wherein said biased member includes pins adapted to engage a base portion of the pivots at said raised position.

8. The retractable step of claim 6 wherein said biased member includes pins adapted to engage a base portion of the pivots at said lowered position.

9. The retractable step of claim 1 wherein said retractable step further includes a top step hingedly connected to said arcuate member.

10. The retractable step of claim 1 wherein said vehicle includes a support adapted to prevent rotation of said arcuate member past horizontal when moving from said raised position to said lowered position.

11. The retractable step of claim 10 wherein said support extends from said vehicle to engage with said first and second ends of said arcuate member.

12. The retractable step of claim 9 wherein said top step includes a pin adapted to engage a shelf support.

13. The retractable step of claim 12 wherein said retractable step further includes a bottom step hingedly connected to said top step.

14. The retractable step of claim 1 wherein said retractable step further includes a fixed step fixedly connected to said arcuate member.

15. The retractable step of claim 14 wherein said fixed step further includes a hinged step hingedly connected thereto.

16. An apparatus comprising:
   a vehicle having a body with a void set inside an exterior surface of the body so as to define at least one wheel well; and
   at least one retractable step in accordance with claim 1.

17. A method for providing access to a vehicle having a void set within the exterior body of the vehicle so as to define a wheel well, the method comprising:
   securing a pair of pivots to the vehicle within the wheel well of the vehicle on opposite sides thereof well of the vehicle;
   supporting an arcuate member by said pair of pivots at a raised position within said wheel well; and
   translating said arcuate member in a downward direction wherein by said downward translation disengages said arcuate member from retaining means so as to thereafter permit rotation of said arcuate member to a horizontal orientation extending from the vehicle proximate to said wheel well.

18. The method of claim 17 further comprising engaging first and second ends of said arcuate member on a support adapted to selectably prevent rotation of said arcuate member lower than horizontal.

* * * * *